United States Patent
Marinopoulos et al.

(10) Patent No.: US 11,228,178 B2
(45) Date of Patent: Jan. 18, 2022

(54) PHOTOVOLTAIC POWER PLANT SYSTEM

(71) Applicant: ABB Schweiz AG, Baden (CH)

(72) Inventors: Antonis Marinopoulos, Alkmaar (NL); Jan Svensson, Västerås (SE); Silverio Alvarez, Baden Dättwil (CH); Stephan Schnez, Zürich (CH)

(73) Assignee: Marici Holdings The Netherlands B.V., Rotterdam (NL)

( * ) Notice: Subject to any disclaimer, the term of this patent is extended or adjusted under 35 U.S.C. 154(b) by 75 days.

(21) Appl. No.: 16/492,313

(22) PCT Filed: Feb. 28, 2018

(86) PCT No.: PCT/EP2018/054062
§ 371 (c)(1),
(2) Date: Sep. 9, 2019

(87) PCT Pub. No.: WO2018/162215
PCT Pub. Date: Sep. 13, 2018

(65) Prior Publication Data
US 2021/0135455 A1 May 6, 2021

(30) Foreign Application Priority Data

Mar. 7, 2017 (EP) ..................... 17159484

(51) Int. Cl.
*H02J 3/38* (2006.01)
*H02M 7/44* (2006.01)
*H02S 40/32* (2014.01)

(52) U.S. Cl.
CPC .............. *H02J 3/381* (2013.01); *H02S 40/32* (2014.12); *H02J 2300/26* (2020.01); *H02M 7/44* (2013.01)

(58) Field of Classification Search
CPC ........ H02J 3/381; H02J 2300/26; H02J 3/383; H02J 3/385; H02J 1/10; H02J 1/102;
(Continued)

(56) References Cited

U.S. PATENT DOCUMENTS

| 9,136,710 B1 | 9/2015 | Baker et al. |
| 2011/0115300 A1* | 5/2011 | Chiang ................... H02J 3/381 307/82 |

(Continued)

FOREIGN PATENT DOCUMENTS

| CN | 104113082 A | 10/2014 |
| EP | 2518855 A2 | 10/2012 |

(Continued)

OTHER PUBLICATIONS

European Patent Office, International Search Report & Written Opinion issued in corresponding Application No. PCT/EP2018/054062, dated Apr. 30, 2018, 11 pp.

(Continued)

*Primary Examiner* — John W Poos
*Assistant Examiner* — Alex W Lam
(74) *Attorney, Agent, or Firm* — Taft Stettinius & Hollister LLP

(57) ABSTRACT

A photovoltaic power plant system for power generation, comprising one or more photovoltaic clusters and one or more modular multilevel converters. Each photovoltaic cluster includes a number of photovoltaic strings connected to one or more MPPT DC/DC, converters connected to a common LVDC, bus. Each photovoltaic cluster includes a DC/DC converter including an input connected to the LVDC bus, and an output connected to a MVDC collection grid. Each of the one or more modular multilevel converters includes an input connected to the one or more photovoltaic (Continued)

clusters via the MVDC collection grid and an output connected to a transmission grid.

20 Claims, 5 Drawing Sheets

(58) Field of Classification Search
CPC ...... H02M 7/44; H02M 3/1584; H02M 7/483; H02M 3/04; H02M 2007/4835; H02S 40/32; H02S 40/34; H02S 40/345; H02S 40/22; H02S 40/36
See application file for complete search history.

(56) References Cited

U.S. PATENT DOCUMENTS

| | | | |
|---|---|---|---|
| 2012/0080955 A1* | 4/2012 | Fishman | H02J 3/381 307/82 |
| 2013/0253716 A1* | 9/2013 | Gross | G06F 1/26 700/287 |
| 2014/0265584 A1 | 9/2014 | Cheng et al. | |
| 2015/0353035 A1* | 12/2015 | Ferrel | B60L 58/20 307/9.1 |
| 2016/0072396 A1* | 3/2016 | Deboy | H02M 1/42 363/21.1 |
| 2016/0099572 A1 | 4/2016 | Gupta et al. | |
| 2016/0172838 A1 | 6/2016 | Luebke et al. | |

FOREIGN PATENT DOCUMENTS

| | | |
|---|---|---|
| EP | 2533412 A2 | 12/2012 |
| EP | 2089913 B1 | 7/2015 |
| WO | 2016009047 A1 | 1/2016 |

OTHER PUBLICATIONS

European Patent Office, International Preliminary Report on Patentability issued in corresponding Application No. PCT/EP2018/054062, dated Jun. 26, 2019, 12 pp.

European Patent Office, Extended Search Report issued in corresponding Application No. 17159484.9, dated Jun. 12, 2017, 7 pp.

* cited by examiner

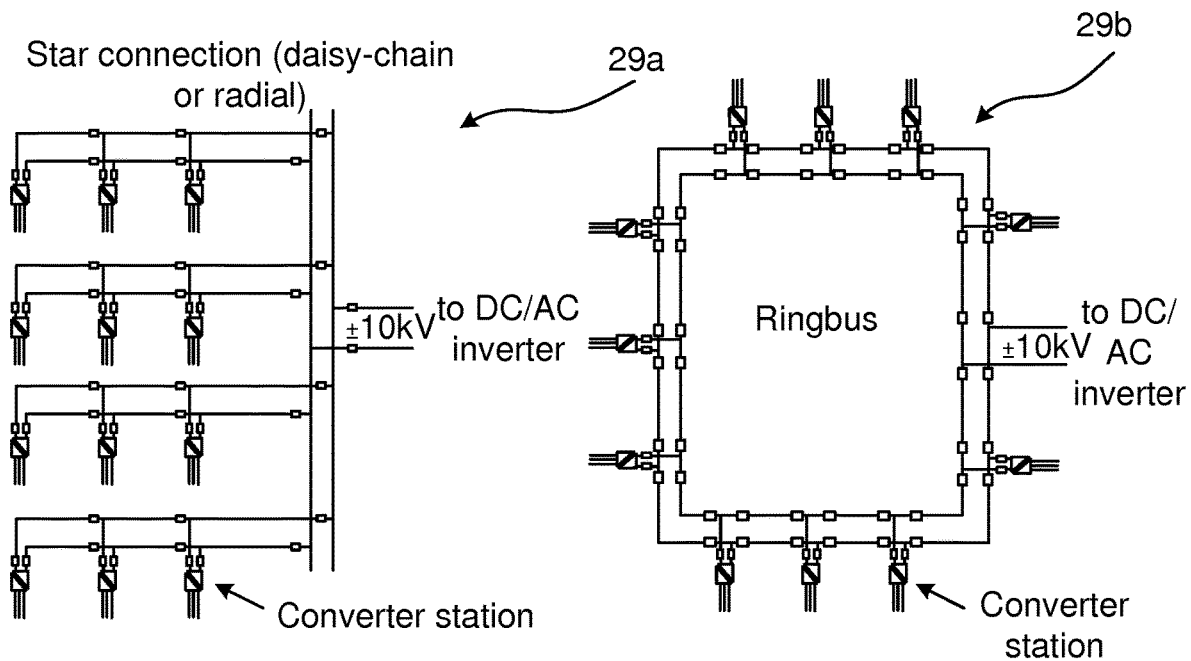
Fig. 5a
Fig. 5b
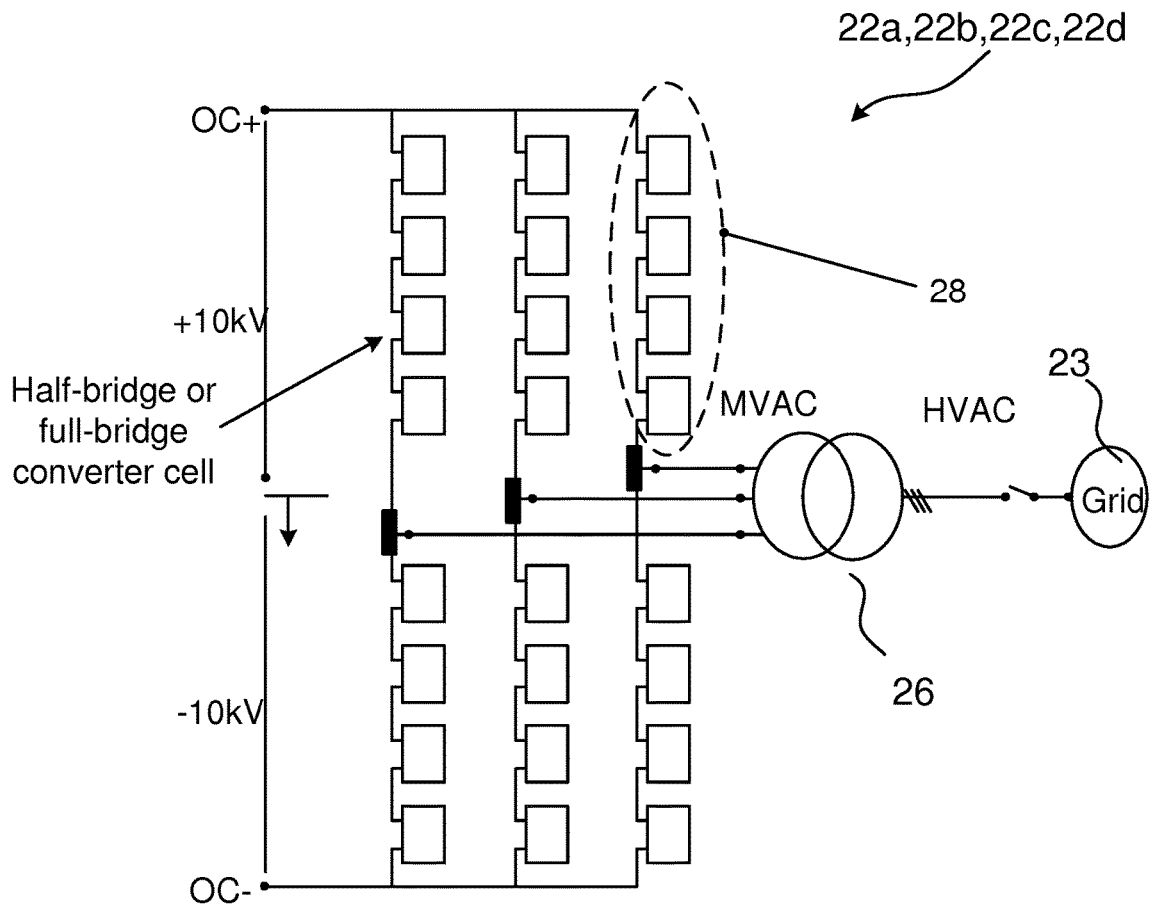
Fig. 6

PHOTOVOLTAIC POWER PLANT SYSTEM

TECHNICAL FIELD

The technology disclosed herein relates generally to the field of solar power generation, and in particular to a photovoltaic power plant system for power generation.

BACKGROUND

During the last decade the price of photovoltaic (PV) cells has decreased substantially, which has led to a boom in the development of photovoltaic power plants. These PV power plants were initially in small and medium scale, i.e. up to some few megawatts (MW). A continued price decline, global pressure for environmental friendly energy sources and regulations and policies that have facilitated developments on PV power systems have led to the development of large and very-large scale PV power plants in the last 4-5 years. A very-large scale PV power plants is in the scale from 100 MW up to 500 MW, and there are plans for even larger plants up to 1 GW.

A main advantage of PV power systems, as with other renewables, is that they have low operating cost owing to free "fuel". An additional advantage of PV power system, in contrast to wind turbines for example, is the absence of moving mechanical parts, which leads to reduced maintenance costs.

Despite the huge drop in PV cell prices, the cost of the remaining equipment of a PV power plant, i.e. the Balance of Systems cost, has not dropped as much. Basically, the technology and the configuration of PV plants have not changed, besides scaling up the power of the components. These components mainly comprise central PV inverters, protection devices, transformers, and cables. In order to continue the development by reducing the price of a complete system, the total cost of these components should also be reduced.

FIG. 1 illustrates a simplified typical configuration for a PV power plant 1. A number of PV units $2_1, \ldots, 2_n$ are grouped together. Currently, the size of a PV unit $2_1, \ldots, 2_n$ as shown in FIG. 1 is up to 5 MW. Each PV unit $2_1, \ldots, 2_n$ comprises a number of PV arrays $3_1, \ldots, 3_m$, each such array comprising a number of PV cells. Each PV array $3_1, \ldots, 3_m$ is connected to a respective of direct current/alternating current (DC/AC) inverter $4_1, \ldots, 4_m$. The DC/AC inverters $4_1, \ldots, 4_m$ convert the DC electric power to an AC power, which is then stepped up by step-up transformers $5_k$. The output from the step-up transformers $5_k$ is applied to a medium voltage AC collection grid 6, which may connect directly to a power substation 7 which in turn connects to a utility grid.

The voltage of the AC collection grid 6 is usually at standardized Medium Voltage (MV) levels, for instance, 20 kV or 33 kV.

One issue with increasing the size of such a PV power plant 1 is that the MV AC cabling increases a lot, but not directly in proportion to the installed power capacity. This is because there is only one collection point for the PV power plant 1: the location of the grid connecting substation 7, which is usually at the edge of the plant. Thus, more MV cables will in general be required for a 50 MW PV plant than for five 10 MW plants. For a typical 100 MW PV plant the length of MV cabling can be around few tens of km. This entails disadvantages such as such reactive power transportation, voltage drop and losses.

SUMMARY OF INVENTION

An objective of the present invention is to provide a photovoltaic power plant system for which the total cost can be reduced compared to prior art. A particular objective is to reduce the amount of cables. Another particular objective is to reduce the losses of the total photovoltaic power plant system. These objectives and others are achieved by the system as defined in the appended independent claim and by the embodiments according to the dependent claims.

The objective is according to an aspect achieved by a photovoltaic power plant system for power generation. The photovoltaic power plant system comprises one or more photovoltaic clusters and one or more modular multilevel converters (MMC). Each of the one or more photovoltaic clusters comprises a number of photovoltaic strings connected to one or more maximum power point tracking (MPPT) direct current/direct current (DC/DC) converters via a combiner box. The combiner box electrically combines the output from the photovoltaic strings. The one or more MPPT DC/DC converters comprises one or more inputs at low voltage level connected to the photovoltaic strings via the combiner box, and an output connected to a common DC low voltage (LV) bus. Each of the one or more photovoltaic clusters comprises a DC/DC converter comprising an input connected to the LVDC bus, and an output connected to a medium voltage DC (MVDC) collection grid. Each of the one or more MMCs comprises an input connected to the one or more photovoltaic clusters via the MVDC collection grid and an output connected to a transmission grid.

The photovoltaic power plant system provides a number of advantages. For instance, from the low voltage DC level of the PV panel cabling the voltage is raised directly to MV level using a DC/DC converter station (comprising the MPPT DC/DC converters and the DC/DC converter) having multiple inputs from combiner boxes. Each DC/DC converter can then be connected in parallel with other DC/DC converters using the MVDC collection grid in different possible configurations. The use of DC/DC converters obviates the need for small distribution transformers, hence reducing cost and footprint. Further, no primary AC cabling at all is needed in the photovoltaic power plant system according to the invention, which enables a cost saving at deployment and also maintenance costs. The use of an MMC provides the advantage of being fully controllable, and may thus be used to control the voltage at the MV collection grid. The MMC may also be used in fault handling of faults occurring in the photovoltaic clusters. The MMC enables the use of more cost-efficient disconnectors instead of DC breakers that have to be used in known photovoltaic power plant systems.

In an embodiment, the one or more MMCs are connected to the transmission grid via one or more parallel connected transformers for raising the output alternating current (AC) voltage to a level of the transmission grid.

In various embodiments, the DC/DC converter comprises a number of galvanically isolated converter cells connected in parallel at their input to the common LVDC bus, and in series at their output for increasing the output voltage to a MV level. In some embodiments, the converter cells are unidirectional, allowing power flow only in the direction from the PV strings to the MVDC collection grid in a fixed voltage ratio, using a medium frequency transformer.

Medium frequency transformers may be used to obtain galvanic isolation of the DC/DC converter cells.

In various embodiments, the rectifier part of the DC/DC converter cell comprises a diode rectifier. The DC/DC converter used in the photovoltaic power plant system is passive and the voltage of the MVDC collection grid is controlled entirely by the modular multilevel converter. The DC voltage is raised by the DC/DC converter cells of the DC/DC converter being series-connected. The medium frequency transformer may thereby have a voltage ratio close to 1:1 that makes the design more effective.

In various embodiments, the one or more DC/DC converters of the MVDC collection grid are arranged in a ring-bus configuration.

In various embodiments, the one or more DC/DC converters of the MVDC collection grid are arranged in a daisy-chain bus configuration.

The above two sets of embodiments provide different advantages. The ring-bus configuration has a higher reliability compared to the daisy-chain bus configuration, but the daisy-chain configuration has reduced costs compared to the ring-bus configuration. In various embodiments, the one or more MMCs are arranged at a common location. The placement of the one or more MMCs at a single location, at the point of interconnection (POI) to the transmission grid, enables an easier fulfillment of grid code requirements than for systems having many dispersed central inverters.

Further, the use of MMC may be used for providing reactive power to the grid, hence still further facilitating fulfilment of the grid code requirements, e.g. in case of grid faults.

In various embodiments, the one or more MMCs comprises full-bridge converter cells.

In various embodiments, the one or more MMCs comprises a mix of full-bridge converter cells and half-bridge converter cells. Such embodiments reduce the cost of the photovoltaic plant system since half-bridges cost less than full-bridge converter cells. In order to be able to properly handle faults on the AC bus and on the DC bus, approximately ¼ of the full-bridges may be replaced by half-bridges in each of the MMC arms.

The invention gives reduced costs for the complete photovoltaic power plant system. For instance, no bulky low-frequency transformers are needed, since they are replaced with much smaller medium frequency transformers in the DC/DC converters. Fewer cables at MV level are needed, and no reactive power compensation is needed since a DC collection grid is used. Further, the invention enables potential for higher efficiencies owing to the MVDC collection grid, which entails lower losses. This gives a flexible and modular design. Further still, AC cables have three conductors, while DC cables have two, and the use of a DC collection grid thereby also reduces the cost of cabling compared to the use of AC collection grid.

When using the PV power plant according to the invention, one or only very few converters are needed at the POI to take care of the grid code requirements, instead of tens of central inverters as today. The invention thereby makes it easier to fulfill today's and tomorrow's grid code while also reducing the costs.

The use of MVDC makes it possible to have long distance cables between the collection grid and the point of connection to the transmission grid without reactive power compensation and with lower losses.

Further features and advantages of the embodiments of the present invention will become clear upon reading the following description and the accompanying drawings.

BRIEF DESCRIPTION OF THE DRAWINGS

FIGS. 5a and 5b illustrate two exemplary configurations of a MVDC collection grid.
FIG. 6 illustrates an embodiment of an MMC for use in the PV power plant according to the invention.

DETAILED DESCRIPTION

Figure 1:
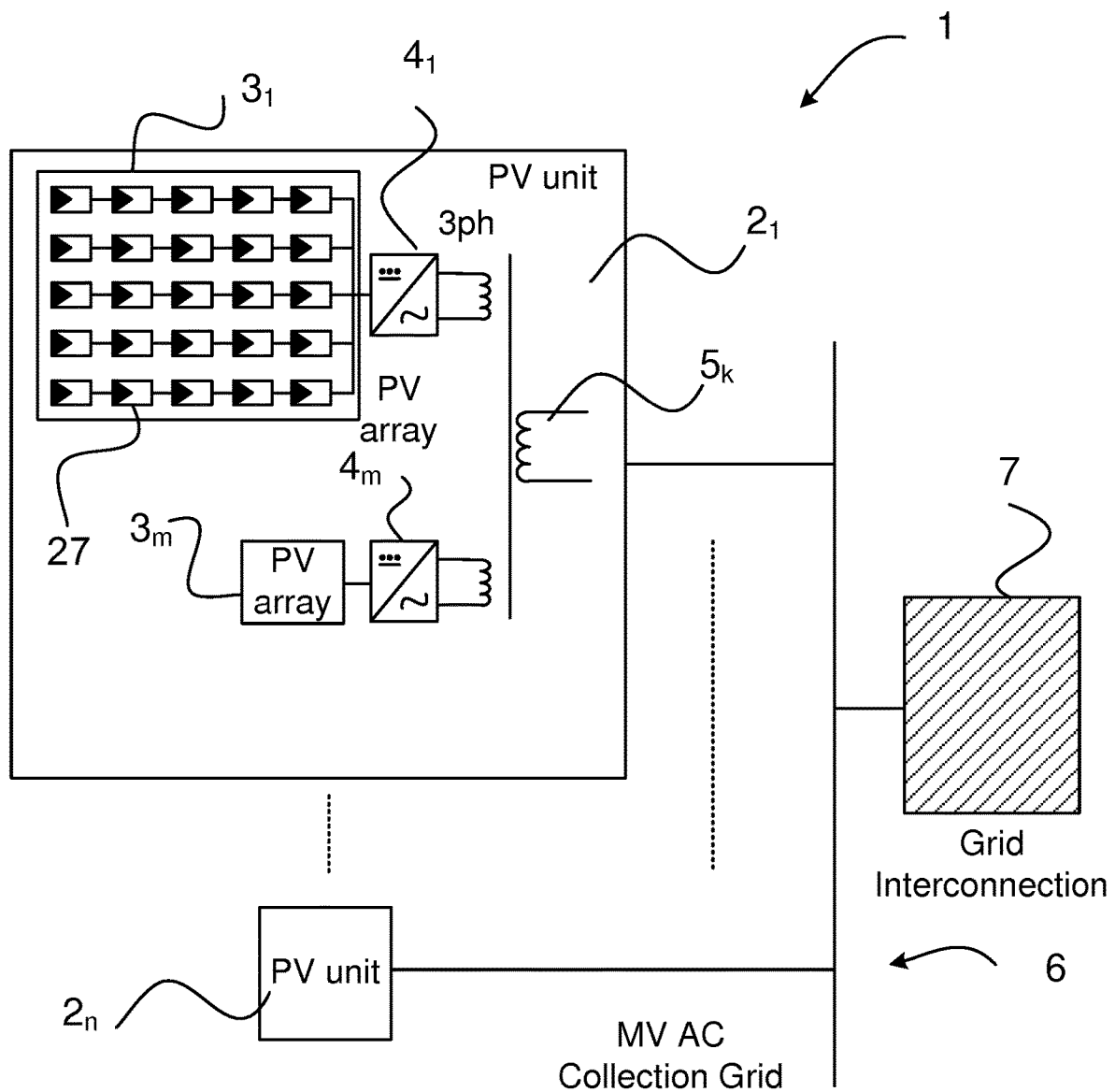
FIG. 1 illustrates a known PV power plant.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Figure 2:
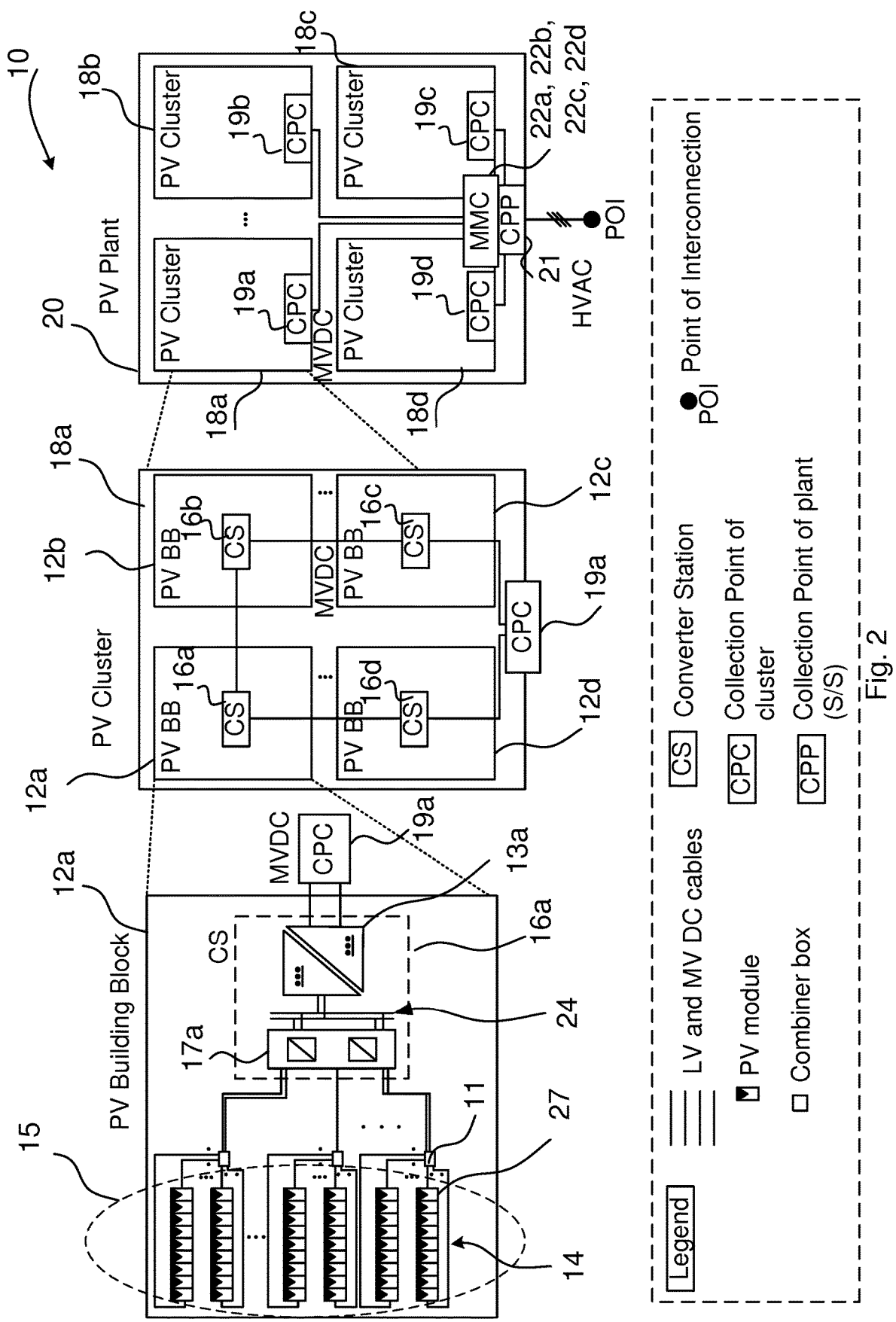
FIG. 2 illustrates a general design of the PV power plant according to the invention.

FIG. 2 illustrates a general design of a photovoltaic (PV) power plant according to the invention, showing three main stages 12a, 18a, 20 of power aggregation therein.

In a first power aggregation stage 12a, a number of PV modules 27 are interconnected (in particular connected in series) in order to reach a desired voltage level, for instance up to about 1.5 kV. Each PV module 27 comprises a number of series- and/or parallel-connected solar cells (also denoted photovoltaic cells) for converting energy of light into electricity. The PV modules 27 form a number of PV strings 14 and groups of PV strings 14 are then interconnected to a respective combiner box 11. Several such combiner boxes may be provided, each electrically combining the output from PV strings 14 of a group. In the figure, the PV strings 14 are shown to be connected in parallel. From the combiner boxes 11 the power is fed to a converter station (CS) 16a with one pair of cables, in contrast to the prior art solution illustrated in FIG. 1, where the power is fed to a central inverter.

The PV strings 14 form a PV array 15, the combiner boxes 11 and the converter station 16a together form a PV Building Block (BB) 12a, i.e. the first power aggregation stage 12a. The converter station 16a may comprise a number of maximum power point tracking (MPPT) DC/DC converters 17a and a DC/DC converter 13a. The converter station 16a has one or multiple inputs (left hand side in the FIG. 2) at low voltage (LV) level in order to connect to the PV arrays 14 via the combiner boxes 11, and one output at MV level (right hand side in the FIG. 2) in order to connect to a MVDC collection grid (as part of a second power aggregation stage, described later), which has a collection point 19a for PV clusters 18a, 18b, 18c, 18d. The DC/DC converter 13a of the converter station 16a may comprise a number of galvanically isolated converter cells connected in parallel at their input, i.e. at the common LVDC bus 24, and in series at their output in order to increase the voltage to the required MV level. In the specific example illustrated in FIG. 2, these converter cells are unidirectional, allowing power flow only in the direction from the PV arrays 15 to the MVDC collection grid in a fixed voltage ratio.

The MPPT DC/DC converter 17a may comprise one large or several smaller MPPT converters. In case of several smaller MPPT converters each of them is connected to one or more PV strings 14 via the combiner boxes 11. The MPPT converter 17a may be a simple boost converter that controls the input DC current from the combiner box 11 to obtain the maximum energy from the PV modules. Its output is connected to a common LVDC voltage bus that is varied according to the MVDC voltage in order to inject the available generation power coming from the PV arrays 15. The voltage of the LVDC bus is a bit higher than the voltage at the PV arrays 15.

In a second power aggregation stage 18a, a number of PV BBs 12a, 12b, 12c, 12d are, as indicated above, connected in series and form a PV cluster 18a. Each PV cluster 18a, 18b, 18c, 18d is then connected to a dedicated DC/AC inverter 22a, 22b, 22c, 22d. The DC/AC inverter 22a, 22b, 22c, 22d may, for instance, comprise a modular multilevel converter (MMC, described more in detail later e.g. in relation to FIG. 6). Typically, there should be one dedicated DC/AC inverter 22a, 22b, 22c, 22d for each PV cluster 18a, 18b, 18c, 18d, but a single MMC 22a, 22b, 22c, 22d may be used in some embodiments. The dedicated DC/AC inverter 22a, 22b, 22c, 22d, in the following exemplified by the MMC 22; 22a, 22b, 22c, 22d, is situated at a collection point of plant (CPP) 21. The MVDC collection grid can be configured in various different ways, for example as a star (daisy-chain) or a ring configuration (for increased availability), as described more in detail later with reference to FIGS. 5a and 5b. Depending inter alia on the installed power capacity the voltage can be in the range of ±5 kV to ±30 kV.

In a final power aggregation stage 20, the MMCs 22a, 22b, 22c, 22d are parallelized in their output, reaching the power of the total PV power plant system 10. Main components of the collection point of the plant (CPP) are the DC/AC inverters 22a, 22b, 22c, 22d, preferably (as mentioned) one for each PV cluster 18a, 18b, 18c, 18d. However, in some embodiments one single DC/AC inverter 22a, 22b, 22c, 22d may take care of the energy generated by more than one PV cluster 18a, 18b, 18c, 18d.

Figure 3:
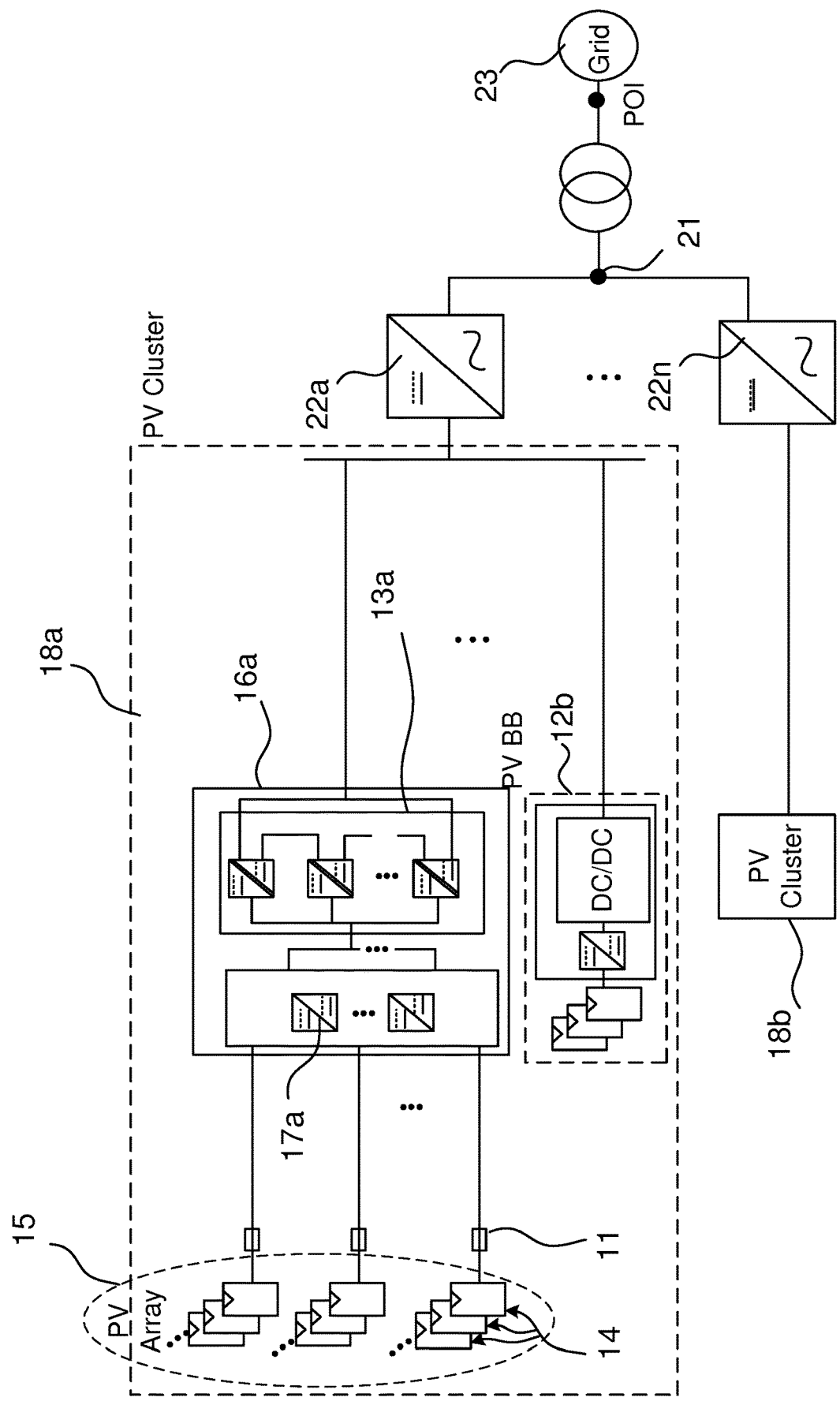
FIG. 3 is a simplified single line diagram of high-level PV power plant design.

FIG. 3 is a simplified single line diagram of high-level PV power plant system 10 according to the present invention.

The converter station 16a is a key component of the solar PV power plant system 10 and comprises one or more MPPT DC/DC converters 17a, a number of inputs for the various PV strings 14, the DC/DC converter 13a that will raise the voltage from LV to MV level. Further, there may additionally also be protection devices, LV and MV switchgear and other auxiliaries. At its output (i.e. the output from the DC/DC converter 13a) the converter station 16a has four terminals, two at negative potential (e.g. −10 kV) and two at positive potential (e.g. +10 kV) for connecting to the MVDC bus.

Figure 4:
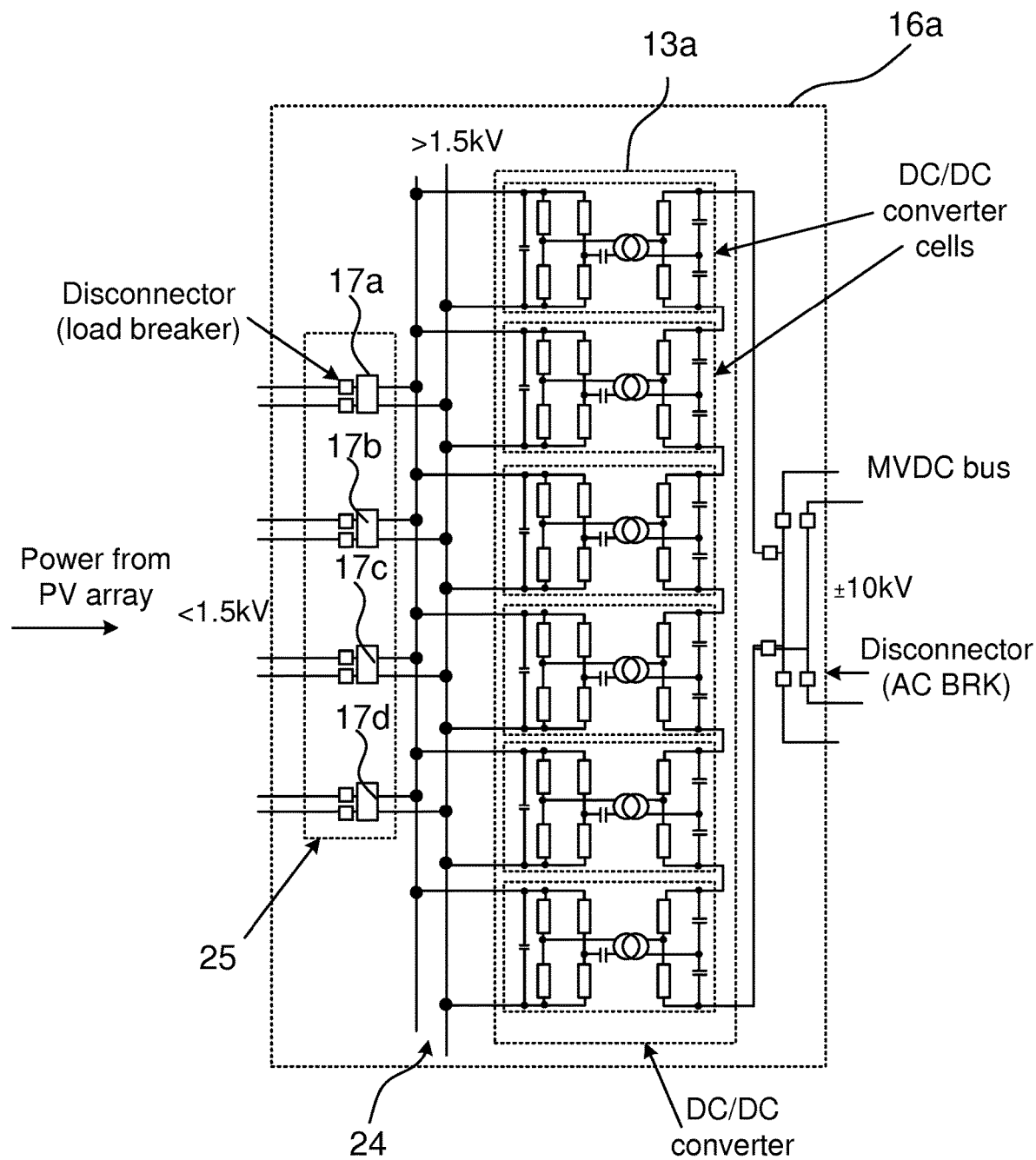
FIG. 4 illustrates an embodiment of a converter station for use in the PV power plant according to the invention.

FIG. 4 illustrates an embodiment of a converter station for use in the PV power plant according to the invention. In the illustrated embodiment of the converter station 16a, a MPPT converter block 25 comprises four MPPT DC/DC converters 17a, 17b, 17c, 17d. The number of MPPT DC/DC converters 17a, 17b, 17c, 17d may be adapted: more converters will extract more energy from the PV arrays but will also increase the total cost. The input voltage may, for instance, be below 1.5 kV (from the PV array) and the common LVDC bus 24 at the output of the MVDC converter block 25 may be at least 1.5 kV. The DC/DC converter 13a may comprise a number of DC/DC converter cells that are connected at their input in parallel to the LVDC bus 24 and at their output in series raising the voltage to MV level. The MV bus in this embodiment is 10 kV, although this value may vary depending on the transformation ratio of a medium frequency transformer (MFT) in the DC/DC converter cells and on the number of such cells connected in series.

The converter station 16a may also comprise LV breakers at the input of the MPPT block, as well as a number of MV AC disconnectors at the output.

The MPPT converter block 25 is a part of the converter station 16a that comprises one or more MPPT DC/DC converters 17a, 17b, 17c, 17d. The MPPT DC/DC converter 17a, 17b, 17c, 17d may be a boost converter, which regulates the current in its input, i.e. the output of one or more PV strings, in order to extract maximum power at each time interval. In the embodiment illustrated in FIG. 4 the input voltage may, for instance, be between 850-1500 V and the output maximum voltage may be at least 1.5 kV. The power rating of the MPPT converter 17a, 17b, 17c, 17d may vary from some tenths of kW up to the full power rating of the whole converter station 16a.

In case more than one MPPT converters 17a, 17b, 17c, 17d are used, the operation may be coordinated. They could, for instance, be controlled such as to get a maximum power from the PV strings 14. However, the maximum power might not always be required, so the power flow (the voltage) through each MPPT converter 17a, 17b, 17c, 17d may be controlled in order to obtain the desired power output.

The DC/DC converter 13a comprises a number of DC/DC converter cells connected in parallel at their input and in series at their output in order to increase the DC voltage to MV level. In the specific embodiment in FIG. 4, it comprises six DC/DC converter cells raising the voltage from, for instance, 1.5 kV to 10 kV. Each converter cell comprises in general an inverter which transforms the LVDC to medium frequency AC voltage. Then an MFT galvanically isolates the input from the output, with a fixed voltage. In general the frequency may vary in the kHz range. Finally, a rectifier transforms the voltage back to DC with normally a higher magnitude than the LVDC bus, although the voltage ratio should be kept relatively low. In the specific embodiment shown in FIG. 4 the converter cell comprises a full-bridge IGBT module, an MFT and a diode module. In the general case an extra converter cell and a bypass switch at the output of each cell can be added for redundancy.

FIGS. 5a and 5b illustrate two exemplary configurations of an MVDC collection grid 29a, 29b. The MVDC collection grid 29a, 29b can be configured in many different ways, optimized in view of one or more of: cost, flexibility in operation, reliability/availability.

In FIG. 5a, a radial configuration of the MVDC collection grid 29a is shown. The PV Building Blocks 12a, 12a, 12b, 12c, 12d are connected in daisy-chain configuration with a pair of cables, which are then connected in parallel with other groups of PV BBs (star configuration) to a common MV bus for the PV Cluster at the input of the DC/AC inverter.

In FIG. 5b, a ring configuration of the MVDC collection grid 29b is shown. The power from the PV BBs 12a, 12b, 12c, 12d is collected in a common MVDC ring bus for each PV Cluster 18a, which is then connected to the DC/AC inverter. For the first configuration the MVDC cables should be able to carry the current from the daisy-chain connected PV BBs, although for reducing the cable cross-section there is also the possibility to use different cables in different segments of the daisy-chain. For the ring configuration the MVDC cables should handle the current of the whole PV Cluster. Parallel cables might be needed to reach this high current level.

FIG. 6 illustrates an embodiment of an MMC for use as the interconnecting DC/AC inverter in the PV power plant system 10 according to the invention. It is noted that the specific values illustrated (±10 kV) are given purely as an example.

As described earlier, at the CPP 21 a number of DC/AC inverters 22a, 22b, 22c, 22d are situated, each of them connected at its input to one or more PV clusters 18a, 18b, 18c, 18d via the MVDC collection grid 29a, 29b and at its output to one or more parallel connected transformers to raise the AC voltage to the level of the connected (sub-) transmission grid 23 via a transformer 26. In preferred embodiments according to the invention, this inverter is an MMC. In one embodiment, as illustrated in FIG. 6, the MMC 22a, 22b, 22c, 22d (only one MMC shown in FIG. 6) is based on full-bridge cells and has a dedicated transformer, which is not necessary in the general case. By using full-bridges, the MMC 22a, 22b, 22c, 22d can control the voltage at the MVDC collection grid. In the MMC 22a, 22b, 22c, 22d, a number of cells are connected in series in each arm 28, which can include one or more redundant cells for enhanced reliability.

In this context it is noted that it is possible to reduce the cost in the MMC by introducing a mix of half-bridges and full-bridges. From a theoretical point of view, the DC voltage and the current can be controlled by using 50% half-bridges and 50% full-bridges. However, in order to be able to handle faults on the AC bus and on the DC bus, approximately ¼ of the full-bridges can be replaced by half-bridges in each of the MMC arms.

Next, a brief description of control, operation and protection methods related to the provided PV power system design is given.

With reference again to FIG. 4, the PV array 15 is feeding the power to the converter station 16a and the MPPT converters 17a, 17b, 17c, 17d regulate the current at their input, in order to extract the maximum power from the one or more respective PV strings 14 connected to each MPPT converter. The MPPT converters 17a, 17b, 17c, 17d boost the voltage pushing the extracted power towards the DC/DC converter cells. Since the outputs of all MPPT converters 17a, 17b, 17c, 17d are connected to a common LVDC bus, coordinated operation may be needed (as mentioned and exemplified earlier).

The converter cells of the DC/DC converter 13a are connected in parallel at their input and in series at their output to increase the voltage to MV level. In the specific embodiment shown in FIG. 4, these cells are unidirectional and "passive", i.e. they do not control the voltage in either their input or their output, but are operated at a fixed frequency and duty cycle, thus just transferring the power that is pushed to them from the MPPT converters 17a, 17b, 17c, 17d towards the MVDC collection grid. In the general case, the DC/DC converter 13a could also be bi-directional, or have some control on the switching frequency and/or duty cycle, as well for instance for protection purposes. The MVDC voltage of the DC collection grid is regulated by the MMC 22. In case of more than one PV clusters, each cluster or set of clusters might has its own MMC, which are then paralleled to the common AC bus. The final connection to e.g. a HVAC transmission grid 23 is done by a MV/HV transformer.

For protection against faults in the PV array 15 and the MMC 22a, 22b, 22c, 22d and transformer parts, known protection may be used, e.g. disconnectors (load breakers). However, an advantage of the herein presented solution comes from the possibilities about the protection strategy of the MVDC collection grid. With reference once again to FIG. 4, the protection devices at the MVDC bus (shown at the right-hand side of the figure) can be simple disconnectors, instead of DC circuit breakers, which are conventionally used. This is because in case of a fault at the MVDC bus, the MMC can, when implemented as a full-bridge converter, block the fault current coming from the AC grid. As for any fault currents from the PV arrays 15, besides the protection LV breakers, the MPPT converter block 25 and the DC/DC converter cells can be controlled such as to simply stop switching and open the circuit to stop feeding the MVDC collection grid. It is also noted that the PV modules do not have high short-circuit current, unlike other types of power generation, wherein rotating masses are included.

As has been described, the present invention provides a PV power plant system 10, which introduces the use of a DC collection grid instead of the conventional AC MV collection grid. The losses in AC are higher than in DC, due to the reactive current. Further, in the case of DC only two cable conductors are needed instead of three for the three-phase AC collection grid, which reduces the costs. According to the invention, AC cabling is not used at all in the PV power plant system 10.

From the low voltage DC level of the PV panel cabling the voltage is raised directly to MV level using a DC/DC converter station.

In some embodiments, the DC/DC converter stations comprises multiple MPPT inputs, connected to a common LVDC bus. Each DC/DC converter can then be connected in parallel with other DC/DC converters using a MV collection grid in different possible configurations.

For the connection to the AC (sub-) transmission grid an MMC is used. This converter is fully controllable, and it is used to control the voltage at the MV collection grid, thus simplifying the energization procedure of the PV power plant and the protection strategy against faults. Additionally, the MMC offers an improved way of fulfilling the grid codes requirements at one point at PV power plant level, which is in contrast to the state-of-the-art of using the central inverter at PV unit level. In other words, there is only a small number of MMCs (e.g. only 2 for a 100 MW PV plant with 50 MW MMCs, in contrast to 50 conventional DC/AC-inverters with 2 MW each) which need to be controlled in accordance with each other and the grid, simplifying control issues significantly.

Further, since the MMC(s) 22; 22a, 22b, 22c, 22d are located at the POI and can provide reactive power, additional capacitor banks are not required, reducing the complexity of a conventional PV power plant.

An important advantage of the herein described photovoltaic power plant system 10 is that there is only one DC/AC inverter (or a few in case of more PV clusters) that needs to fulfill the requirements of grid interconnection codes and it is situated near the Point Of Interconnection (POI). In contrast, using the state-of-the-art a typical MW-scale PV power plant has tens of central inverters that need to control power flow and voltage, etc. in order to fulfill the requirements. However, these requirements need to be guaranteed at the POI, while the central inverters can be located hundreds of meters away connected to the POI through long AC cables. Thus, the handling of reactive power and losses as well as the coordination of so many inverters is a big challenge, which can be avoided using the proposed MVDC collection grid and the MMC.

In summary, the photovoltaic power plant system 10 according to the invention comprises, in various embodiments:

Flexible DC/DC converter 13a for raising the voltage from LVDC to MVDC, with one or more MPPT converters 17a, thus making small distribution transformers unnecessary.

A MVDC collection grid 29a, 29b removing the need of DC breakers (as disconnectors can instead be used), and a voltage controllable from the grid-connected DC/AC inverter (MMC).

A PV power plant distribution grid without need for reactive power compensation (as a DC collection grid is used instead of the conventional AC collection grids).

A transmission grid connection using one (or only few) DC/AC inverters (in particular MMCs) at one single location, whereby the grid code requirements can be fulfill easier than many dispersed central inverters would, and also enabling provision of reactive power to the transmission grid.

The photovoltaic power plant system 10 according to the invention provides a flexible and modular system design:

MVDC voltage is optimized according to PV plant size (in terms of power).

DC/DC converter is also optimally sized in terms of power.

System can be optimized for lowest costs or highest reliability.

DC current and DC voltage control of MVDC collection grid by using full-bridge cell equipped modular multilevel converters.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A photovoltaic power plant system for power generation, the photovoltaic power plant system comprising one or more photovoltaic clusters and one or more modular multilevel converters, wherein:
   each of the one or more photovoltaic clusters comprises a number of photovoltaic strings connected to one or more MPPT DC/DC converters via a combiner box, the combiner box electrically combining the outputs from the photovoltaic strings, wherein the one or more MMPT DC/DC converters comprise one or more inputs connected to the photovoltaic strings via the combiner box, and an output connected to a common LVDC bus,
   each of the one or more photovoltaic clusters comprises one or more DC/DC converters comprising an input connected to the LVDC bus, and an output connected to an MVDC collection grid, wherein the DC/DC converter comprises a number of galvanically isolated converter cells connected in parallel at their input to the common LVDC bus, and in series at their output for increasing the output voltage to a MV level, and
   each of the one or more modular multilevel converters comprises an input connected to the one or more photovoltaic clusters via the MVDC collection grid and an output connected to a transmission grid.

2. The photovoltaic power plant system as claimed in claim 1, wherein the one or more modular multilevel converters are connected to the transmission grid via one or more parallel connected transformers for raising the output AC voltage to a level of the transmission grid.

3. The photovoltaic power plant system as claimed in claim 1, wherein a rectifier part of the DC/DC converter comprises a diode rectifier.

4. The photovoltaic power plant system as claimed in claim 1, wherein the one or more DC/DC converters of the MVDC collection grid are arranged in a ring-bus configuration.

5. The photovoltaic power plant system as claimed in claim 1, wherein the one or more DC/DC converters of the MVDC collection grid arranged in a daisy-chain bus configuration.

6. The photovoltaic power plant system as claimed in claim 1, wherein the one or more modular multilevel converters are arranged at a common location.

7. The photovoltaic power plant system as claimed in claim 1, wherein the one or more modular multilevel converters comprises full-bridge converter cells.

8. The photovoltaic power plant system as claimed in claim 1, wherein the one or more modular multilevel converters comprises a mix of full-bridge converter cells and half-bridge converter cells.

9. The photovoltaic power plant system as claimed in claim 1, wherein a DC/DC converter station comprises the MPPT DC/DC converter and the DC/DC converter, the DC/DC converter station comprising multiple MPPT inputs and being connected to the LVDC bus.

10. The photovoltaic power plant system as claimed in claim 2, wherein a rectifier part of the DC/DC converter comprises a diode rectifier.

11. The photovoltaic power plant system as claimed in claim 2, wherein the one or more DC/DC converters of the MVDC collection grid are arranged in a ring-bus configuration.

12. The photovoltaic power plant system as claimed in claim 3, wherein the one or more DC/DC converters of the MVDC collection grid are arranged in a ring-bus configuration.

13. The photovoltaic power plant system as claimed in claim 2, wherein the one or more DC/DC converters of the MVDC collection grid are arranged in a daisy-chain bus configuration.

14. The photovoltaic power plant system as claimed in claim 3, wherein the one or more DC/DC converters of the MVDC collection grid are arranged in a daisy-chain bus configuration.

15. The photovoltaic power plant system as claimed in claim 2, wherein the one or more modular multilevel converters are arranged at a common location.

16. The photovoltaic power plant system as claimed in claim 3, wherein the one or more modular multilevel converters are arranged at a common location.

17. The photovoltaic power plant system as claimed in claim 2, wherein the one or more modular multilevel converters comprises full-bridge converter cells.

18. The photovoltaic power plant system as claimed in claim 3, wherein the one or more modular multilevel converters comprises full-bridge converter cells.

19. The photovoltaic power plant system as claimed in claim 2, wherein the one or more modular multilevel converters comprises a mix of full-bridge converter cells and half-bridge converter cells.

20. The photovoltaic power plant system as claimed in claim 2, wherein a DC/DC converter station comprises the MPPT DC/DC converter and the DC/DC converter, the DC/DC converter station comprising multiple MPPT inputs and being connected to the LVDC bus.

* * * * *